June 11, 1946. E. A. JOHNSON 2,401,739
CO-CURRENT-COUNTERCURRENT REGENERATOR
Filed Aug. 25, 1941
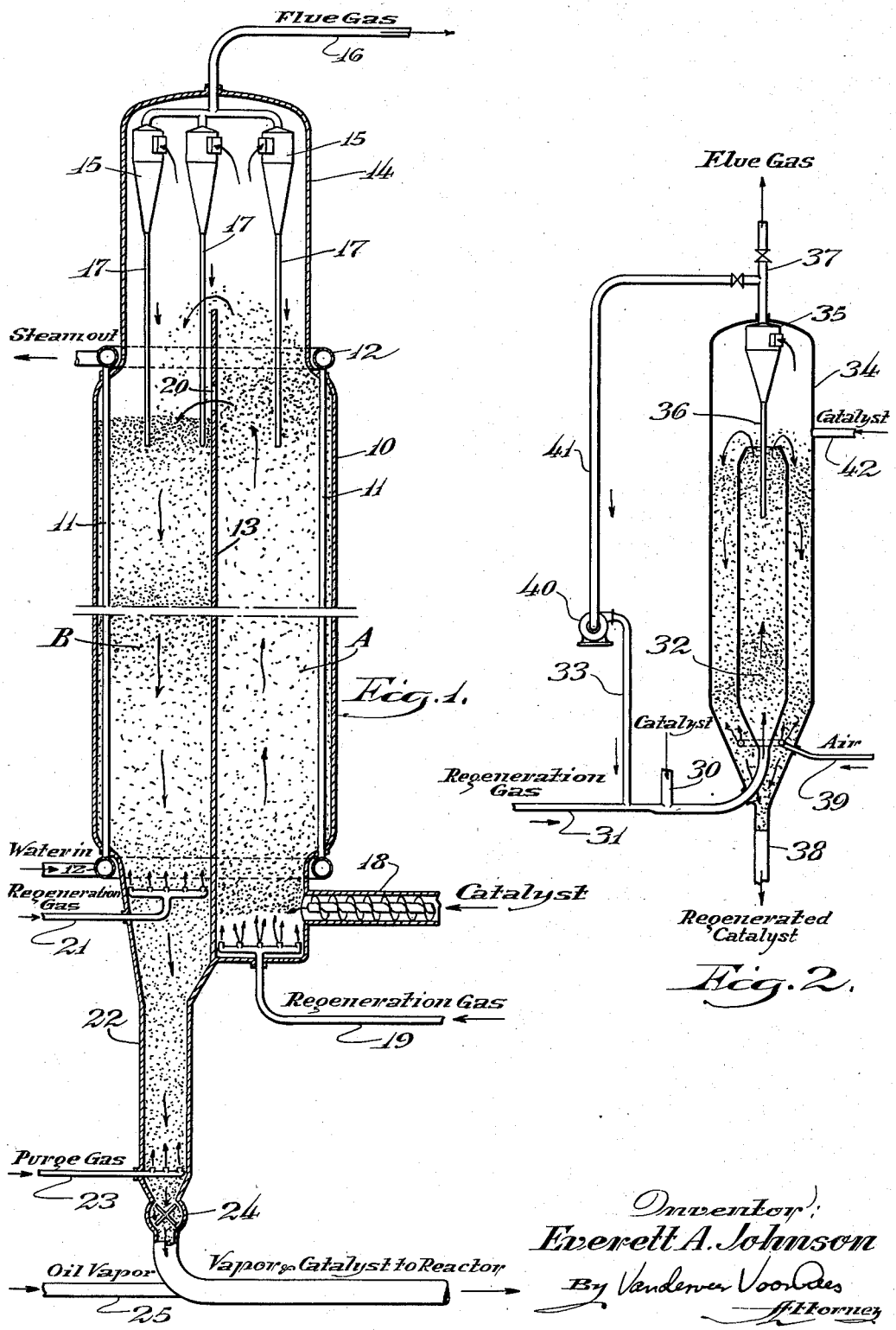

UNITED STATES PATENT OFFICE 2,401,739

COCURRENT-COUNTERCURRENT REGENERATOR

Everett A. Johnson, Park Ridge, Ill., assignor to Standard Oil Company, Chicago, Ill., a corporation of Indiana Application August 25, 1941, Serial No. 408,177

10 Claims. (Cl. 252—242)

This invention relates to the conversion of hydrocarbons at high temperatures in the presence of solid, heterogeneous catalysts, generally suspended in the hydrocarbon vapors. It applies especially to the conversion of heavy hydrocarbon oils into lighter products, principally gasoline of high knock rating, by the action of catalysts where the catalyst becomes temporarily deactivated by a deposit of carbonaceous material, thus requiring frequent regeneration. More particularly, the invention relates to a method and apparatus for regenerating the catalyst in such a hydrocarbon conversion process. According to the present invention, the carbonaceous matter is removed from the catalyst by combustion with an oxygen-containing gas applied under specially controlled conditions.

One of the objects of this invention is to control the conditions of regeneration more closely than has been done heretofore. Another object of the invention is to obtain simultaneously concurrent and countercurrent regeneration of finely divided, powdered catalyst flowing in a continous stream thru a regenerating zone without overheating the catalyst. Another object of the invention, in some of its forms, is to recover the heat of combustion of the carbonaceous matter deposited on the catalyst. Other objects of the invention will be apparent from the following description.

The invention is illustrated by a drawing in which

Figure 1 is a diagrammatic elevation in section of one modification of the regenerating apparatus in which the regeneration occurs in two successive stages, concurrently, then countercurrently.

Figure 2 is another form of the apparatus as shown in Figure 1, with the upflowing and downflowing catalyst passages arranged concentrically.

Referring to Figure 1, the regenerator 10 is provided with vertical cooling tubes 11 which lie within the regenerator and near the outer wall thereof. The cooling tubes are connected with headers 12 lying outside of the regenerator. If desired, however, the headers 12 may be located inside. The regenerator is preferably cylindrical and is divided into two zones by partition 13. If desired, the partition 13 may be arcuate in form or other suitable shape to allow for expansion. A dome 14 at the top of the regenerator provides a vapor space for withdrawing spent regeneration gases. In the vapor space there are located one or more dust separators 15 in which the spent gases are substantially freed of fine catalyst which would otherwise be carried away from the system. From the dust separators the spent regeneration gases are withdrawn by line 16. Fine catalyst flows from dust separators thru catalyst legs 17 leading into the dense phase of catalyst lower in the regenerator.

In the operation of the regenerator, the spent catalyst having a surface fouled with carbonaceous deposit is introduced into zone A by means of conveyor 18 or other suitable means. For example, the catalyst may be introduced in suspension in a gas or it may flow in thru a regulating valve by gravity from a higher level. One of the outstanding characteristics of this powdered catalyst is that it forms relatively stable suspensions in gases which may exit either in a completely dispersed phase or a dense phase, depending on ratio of catalyst to vapors, turbulence, catalyst particle size and other factors. For the catalysts employed in hydrocarbon conversion, particularly in cracking, the dense phase will usually have a density of about 10 to 25 pounds per cubic foot and in this form the catalyst behaves very much as a liquid. On prolonged quiescent standing, the dense phase will segregate into a non-flowing catalyst layer and a gas layer and it is generally necessary to inject into the catalyst a small amount of aeration gas to keep the catalyst in a free-flowing condition. I prefer to operate my regenerator with catalyst in the dense phase, in both zones A and B, altho zone A may be operated as a disperse phase with zone B in dense phase. The disperse phase may contain only 1 to 5 pounds of catalyst per cubic foot or less.

Referring again to Figure 1, there is introduced with the catalyst in the base of zone A an oxygen-containing gas, for example, air or air diluted with flue gas, nitrogen or other inert gas to control its oxygen content. An oxygen content of about 2 to 10% is generally suitable. If desired, the regeneration gas may be introduced by a separate line, for example, thru distributor 19. Catalyst and regenration gas flow upwardly in a turbulent manner thru zone A where sufficient time is provided for effecting partial combustion of carbon and complete utilization of the oxygen contained in the regeneration gas introduced into A. The flow of gas and the heat evolved from this reaction are transferred into tubes 11 which are filled with a suitable heat transfer agent, e. g., mercury vapor, fused salts, or water under high pressure. Where water is used the steam generated may be used to provide auxiliary power or heat in the system.

At the top of zone A spent gases escape in dome 14 and the catalyst flows thru port 20 in baffle 13 or it may overflow the baffle in some cases entering the countercurrent regeneration zone B. In that zone the catalyst flows downward in turbulent contact with additional oxygen-containing regeneration gas introduced at 21. Sufficiently low gas velocity is maintained in B to assure dense phase operation. The oxygen content of the gas introduced at 21 is preferably higher than that of the gas introduced at 19, thereby insuring a more rapid and complete reaction with the residual carbonaceous material remaining on the catalyst.

At the base of zone B the catalyst flows into purging section 22 where it is purged of oxygen-containing gases by a suitable purging gas, e. g., steam or flue gas introduced thru distributor 23. From the purging section, the regenerated catalyst flows thru a suitable valve or metering device 24 directly and without cooling, into a stream of hydrocarbon vapors supplied by line 25 flowing to a hydrocarbon conversion zone not shown. The catalyst may also be employed in other processes such as dehydrogenation, dehydration of alcohols, etc.

In Figure 2 is shown another arrangement of the regenerator design substantially as described in Figure 1 but without any special indirect cooling means being provided other than radiation and convection from the outer walls of the apparatus, and cooling by recycling of cool gases. In this modification, the catalyst is introduced by conveyor or line 30 whence it is carried into the regenerator by a stream of regeneration gas introduced at 31. For this purpose an oxidizing gas having an oxygen concentration of the order of 2 to 10% is generally satisfactory. The catalyst may be supplied in a preheated condition. For example, it may flow directly to the regenerator from the reactor without cooling after separation from hydrocarbon vapors.

Oxidation of the catalyst begins immediately and continues in the upflow regeneration chamber 32 wherein the catalyst is maintained in a dispersed, actively agitated, turbulent condition. As a result of the high turbulence existing in 32, there is substantially no local overheating of the catalyst from the exothermic oxidation reaction. The temperature in 32 may thus be readily controlled by controlling the amount of oxygen present and also the amount of inert gas supplied with regeneration gas thru 31. Additional diluting gas may be introduced by line 33 as will be hereinafter described.

The catalyst and regeneration gases pass out of the top of chamber 32 where this chamber communicates with a larger concentric regeneration chamber 34. The gas velocity in 32 is maintained sufficiently low to permit separation of catalyst from gases to a substantial extent. Some of the catalyst, however, is carried upward by the spent regeneration gases which flow thru cyclone separator 35 where a substantially complete separation between gas and catalyst is effected. The catalyst from 35 flows downward thru the catalyst leg 36 while the gases are discharged from the system by line 37. Catalyst leg 36 may discharge into either the inner chamber 32 as shown or into the outer chamber 34 if desired.

Partially regenerated catalyst leaving chamber 32 now flows downwardly through the annular space in chamber 34 toward the catalyst outlet 38. While flowing through the annular space the catalyst is contacted with additional oxidizing gas containing a higher concentration of oxygen than that supplied to chamber 32. Air may be employed undiluted for this purpose by line 39. Thus a more complete regeneration of the catalyst is effected than is the case where the entire regeneration is carried out with highly diluted oxidizing gas. At the same time, satisfactory temperature control is obtainable by virtue of the fact that a large part of the carbonaceous matter has already been removed from the catalyst in 32. Furthermore, that part of the carbonaceous matter containing hydrogen, including adsorbed hydrocarbons deposited on the catalyst, is substantially all removed in the initial regeneration stage in 32. I have found that this hydrogen-containing material which contaminates the catalyst is most productive of heat on regeneration and, therefore, most difficult to remove, without overheating, in a regeneration zone of high oxygen concentration. In my process this problem is largely solved by eliminating the hydrogenous material in an upflow, tubulent, regeneration zone in which the oxygen concentration is carefully controlled.

Cooling of the reaction occurring in chamber 34 may be accomplished by any desired means or simply by radiation and convection to the surrounding atmosphere. Cooling may also be facilitated by supplying cold oxidizing gas at 39. One of the problems in catalyst regeneration, where complete regeneration is desired, lies in obtaining temperature control in the presence of high oxygen concentration, that is, concentrations of 5 to 20%. The effect of cooling may result in suddenly dropping the temperature below the regeneration point whereas insufficient cooling permits overheating. The regeneration apparatus, which forms the subject of my invention in part, greatly facilitates complete regeneration by maintaining the catalyst in contact with a heated surface at that point in catalyst travel where the catalyst is nearly regenerated and where there is insufficient combustible material remaining on the catalyst to alone maintain the temperature of the regeneration reaction where the oxidizing gases supplied are at a lower temperature. Thus there is no danger of the reaction temperature falling below the kindling point throughout the catalyst body. In the operation of my process it is preferred to maintain the initial regeneration zone 32 at a higher temperature than the final regeneration zone in which the catalyst is flowing downward and countercurrent to the up-flowing stream of oxidizing gas introduced at 39. Operating in this manner, heat is conducted from the initial regeneration zone to the final regenerating zone through the walls separating the two zones.

As an aid in controlling the regeneration temperature in chamber 32 and/or chamber 34, I prefer to recycle some of the spent regeneration gases. This may be accomplished by means of blower 40 and lines 41 and 33. If desired, the recycled gases may be substantially cooled before reintroducing into the regenerator.

New catalyst may be added to the conversion system by charging to the regeneration zone 34 thru line 42. Partially regenerated catalyst from another regenerator may likewise be added at this point, in order to complete its regeneration in chamber 34. If desired, an inert, granular, solid, heat absorbing material may be introduced at this point to assist in controlling the regeneration temperature in the presence of the high oxygen concentration in 34.

The catalysts used in my process are generally siliceous type cracking catalysts, for example, active silica in combination with other metal oxides which act as promoters. Silica gel or precipitated silica in combination with alumina or magnesia are suitable catalysts, the latter oxides being present generally in the amount of about 5 to 25%. Acid treated clays, such as bentonite, are also effective catalysts. The catalysts may be in the form of fine powder or granular material, for example, 10 to 15 mesh. In general, however, the catalyst which I prefer to employ is in the form of a powder finer than this having a particle size corresponding to about 100 to 400 mesh and even finer. I may also use my improved regenerator to restore other solid catalysts which have been contaminated with carbonaceous deposits. Dehydrogenation catalysts containing VIth group metal oxides are examples.

In cracking, I prefer to employ about ½ to 5 parts of catalyst by weight for each part of oil treated and it is usually desirable to maintain in the reactor sufficient catalyst to provide catalyst contact as indicated by the rate of about 1 pound of oil per hour per pound of catalyst present in the reactor. However, this contact factor may be greater or less; for example, it may be as low as ½ pound per hour or as high as 10 pounds per hour in some cases.

The temperature of conversion is usually within the range of about 800 to 1050° F. but will vary in different operations with different catalysts and different feed stocks. For example, when employing acid treated bentonite catalyst with a contact factor of 1 and charging Mid-Continent gas oil, I may employ a temperature of about 925° F. to obtain a conversion of about 30 to 40% of the stock into gasoline. It is preferable to employ low pressures, generally slightly above atmospheric pressure, for example, 5 to 25 pounds per square inch gage and generally not more than 50 to 100 pounds per square inch. When employing pressure, it is desirable to operate the regenerator and reactor at about the same pressure, in order to avoid the difficulties involved in catalyst transfer between zones of widely different pressures.

In the regeneration of the catalyst, it is important to avoid excessive temperatures resulting from the exothermic regeneration reaction or combustion of carbon on the surface of the incombustible catalyst. In general, temperatures of the order of 1000 to 1200° F. are satisfactory for most catalysts. Higher temperatures will result in permanent loss of activity in the case of some catalysts such as the magnesia-silica catalysts. Synthetic catalysts of the alumina-silica type may be regenerated at temperatures as high as 1400 to 1600° F. without excessive degeneration altho loss of activity is greater at these temperatures than when the catalyst is regenerated at lower temperatures. Recirculation of gas assists in controlling temperature by increasing the mass of material to be heated and also by reducing the oxygen concentration.

Altho I have described my process of regeneration of powdered catalyst particularly as it is applied to the cracking of heavy hydrocarbon oils, the process is also applicable to other high temperature reactions with powdered, solid, refractory catalysts. For example, process of catalytic hydrogenation, dehydrogenation, aromatization of napthas, and reforming of napthas in the presence of hydrogen as well as catalytic polymerization and alkylation carried out at elevated temperatures, generally within the conversion range, with the aid of suspended powdered catalysts, may also be improved by the application of my regeneration method. In the regeneration of any of these solid catalysts which have been contaminated with carbon, my method has the advantage of improved control of temperature from concurrent oxidation in the initial stage followed by countercurrent oxidation to effect more complete regeneration in the later stage. The development of hot zones within the catalyst is largely avoided by this method.

Where I have referred to countercurrent and concurrent flow of catalyst and gases, it must be understood that these terms refer to the overall operation in the different zones. In a turbulent system as herein described it is obvious that the flow can not be truly countercurrent thruout every part of the system.

Altho I have described my invention by means of certain specific applications, I intend that the invention be defined only by the following claims.

I claim:

1. The process of regenerating subdivided, combustible, solid, refractory catalyst material which has been contaminated with carbonaceous matter, which comprises forming a dense, fluid suspension of said catalyst material in an oxygen-containing regeneration gas in an initial regeneration zone wherein said catalyst and regeneration gas flow concurrently upward, maintaining the temperature of said regeneration zone above the minimum combustion temperature but below the temperature at which said catalyst is deteriorated, regulating the oxygen concentration of said regeneration gas to effect partial regeneration of said catalyst without exceeding the said deterioration temperature for the catalyst, separating partially regenerated catalyst from spent regeneration gas in a separating zone, contacting said partially regenerated catalyst in dense, fluid suspension in a final regeneration zone with additional oxygen-containing gas flowing upward countercurrently to said catalyst, employing a sufficient concentration of oxygen in said final regeneration zone to complete the regeneration of said catalyst, withdrawing regenerated catalyst from said final regeneration zone and withdrawing spent regeneration gases from said separating zone.

2. The process of claim 1 wherein the regeneration temperature is maintained between about 1000 and 1600° F.

3. The process of claim 1 wherein said final regeneration zone is contiguous to said initial regeneration zone, said initial regeneration zone is operated at a higher temperature than said final regeneration zone and heat is conducted from said initial regeneration zone to said final regeneration zone by direct thermal communication therebetween.

4. The process of regenerating powdered, solid, refractory, metal oxide catalysts contaminated with carbon which comprises flowing a dense, fluid suspension of said catalyst in series thru an initial regeneration zone and a final regeneration zone in heat conducting relation therewith, maintaining catalyst in suspension in said zones by means of upflowing currents of regeneration gas, separating spent regeneration gas from catalyst at a point intermediate said zones, supplying said initial zone with an amount of oxygen insufficent to effect complete removal of carbon from said catalyst but sufficient to maintain the temperature within the desired regeneration temperature range, supplying said final regeneration zone with sufficient oxygen to substantially complete regeneration of said catalyst and maintaining the flow of catalyst concurrent to regeneration gas in said initial zone and countercurrent in said final zone.

5. The process of regenerating powdered, solid, refractory, metal oxide catalysts contaminated with carbon which comprises flowing a stream of said catalyst in dense, fluid suspension in series thru an initial regeneration zone and a final regeneration zone in heat conductive relation therewith, maintaining catalyst in dense, fluid suspension in said zones by means of upflowing currents of regeneration gas, separating regeneration gas from catalyst at a point intermediate said zones, supplying said initial zone with an amount of oxygen insufficient to effect complete removal of carbon from said catalyst but sufficient to maintain the temperature within the desired regeneration temperature range, supplying said final regeneration zone with sufficient oxygen to substantially complete regeneration of said catalyst maintaining the temperature of said final regeneration zone below that of said initial regeneration zone, and supplying heat to said final regeneration zone by conduction from said initial regeneration zone.

6. In the process of regenerating incombustible, subdivided, solid catalytic material contaminated with carbonaceous matter wherein said material is subjected to the oxidizing action of an oxygen-containing gas at regeneration temperature and difficulty is encountered with controlling the temperature during the regeneration reaction, the improvement comprising regenerating said catalyst by contacting it in dense, fluid suspension with oxygen-containing gas in two stages in series, the proportion of oxygen supplied to the first stage being limited to an amount insufficient to effect complete combustion of carbonaceous matter contained on said catalyst and insufficient to heat the catalyst by said combustion to a temperature at which the catalyst is deteriorated, the amount of oxygen supplied to the second stage being in excess of that required for complete combustion of carbonaceous matter remaining on said catalyst contacting catalyst and gases concurrently in said first stage and countercurrently in said second stage, separating spent regeneration gases from catalyst between said regeneration stages and withdrawing regenerated catalyst from the second regeneration stage.

7. The process of claim 1 wherein said catalyst suspension has a density of about 10 to 25 pounds per cubic foot.

8. The process of regenerating incombustible solids contact material of small particle size which has become deactivated by deposits thereon of combustible carbonaceous matter, which process comprises suspending said material in a first upflowing stream of oxygen-containing gas and passing said stream and suspended solids material upwardly through a first contacting zone at a regeneration temperature and with such vertical gas velocity as to maintain the solids material in dense phase suspension, thereby effecting partial regeneration of said solids in said first contacting zone, maintaining a light disperse solids phase in a solids separation zone above said first contacting zone and in open communication therewith and also above and in open communication with a second contacting zone, flowing solids from the upper part of the dense phase in said first contacting zone directly to the upper part of said second contacting zone, introducing a second oxygen-containing gas stream at the base of said second contacting zone, passing said second gas stream upwardly through said second contacting zone counter-current to the downwardly flowing solids therein, at a temperature for effecting further regeneration by combustion of carbonaceous matter from the solids and at such vertical velocity as to maintain the solids in dense phase condition in the second contacting zone thereby completing the regeneration of said solids, combining the gasiform streams from the contacting zones in said separation zone, separating solids from the disperse phase in said separation zone and returning said separated solids to at least one of said contacting zones, withdrawing the combined gasiform streams from said separation zone, and separately withdrawing solids as a downwardly moving column directly from the dense solids phase in said second contacting zone.

9. An apparatus for regenerating subdivided solid free-flowing hydrocarbon conversion catalyst contaminated by carbonaceous matter which comprises a vertically elongated chamber divided by a baffle into two vertical passages merged at their upper ends in to a common space, means for introducing gas at a low point in each of said passages, means for introducing catalyst at a low point in one of said passages, means for drawing catalyst at a low point from the other of said passages, means for withdrawing gas from the common space and cooling tubes disposed longitudinally within said chamber adjacent the walls thereof and exposed to direct contact with said catalyst thereby leaving said passages substantially unobstructed.

10. An apparatus for regenerating subdivided solid catalysts contaminated with carbonaceous matter which comprises a vertically elongated chamber divided by a baffle into two vertical passages merged at their upper ends into a common space, means for introducing gas at a low point in each of said passages, means for introducing catalyst at a low point in one of said passages, means for withdrawing catalyst at a low point from the other of said passages, means for withdrawing gas from the common space, and vertically disposed tubes within said chamber adjacent the outer wall thereof, said tubes extending through the ends of the chamber and communicating with suitable headers outside of said chamber.

EVERETT A. JOHNSON.

Certificate of Correction

Patent No. 2,401,739.

June 11, 1946.

EVERETT A. JOHNSON

It is hereby certified that error appears in the printed specification of the above numbered patent requiring correction as follows: Column 6, lines 27 and 28, claim 1, for "combustible" read *incombustible*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.*